Oct. 21, 1958   A. R. M. E. RIGOINE DE FOUGEROLLES   2,857,188
METHOD OF ASSEMBLING TUBULAR ELEMENTS
Filed March 25, 1957

United States Patent Office 2,857,188
Patented Oct. 21, 1958

2,857,188

METHOD OF ASSEMBLING TUBULAR ELEMENTS

André René Marie Emile Rigoine de Fougerolles, Paris, France

Application March 25, 1957, Serial No. 648,220

Claims priority, application France March 26, 1956

3 Claims. (Cl. 287—54)

This invention relates to improvements in the method of erecting tubular constructions and is characterized by the use of improved means for assembling tubular and other sections with one another, these means being suitable for utilizing the elastic deformation of these tubular elements in combination with the elastic deformation of collars or like members which clamp them, by introducing wedge-forming keys or cotters the slopes of which are calculated as a function of the coefficient of friction of the surfaces in contact so as to remain irreversible in spite of the stress resulting from the aforesaid elastic deformations, the application of this method to tubular constructions providing simple, low-cost and nearly instantaneous assemblies.

In order to afford a clearer understanding of this invention and of the manner in which the same may be carried out in the practice, reference will now be made to the attached drawing forming part of this specification and illustrating diagrammatically by way of example a few typical embodiments thereof. In the drawing.

Figure 1:
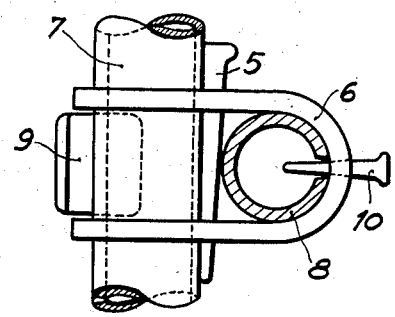
Figure 1 is a side elevational view showing an assembling device.
Figure 2:
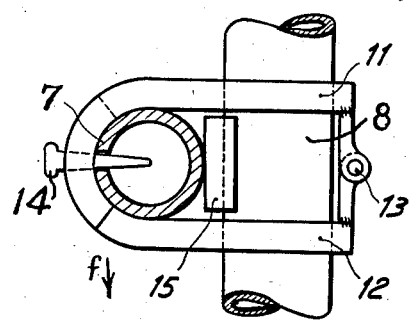
Figures 2 and 3 are other views showing alternate, modified embodiments incorporating hinge means.
Figures 1A, 3:
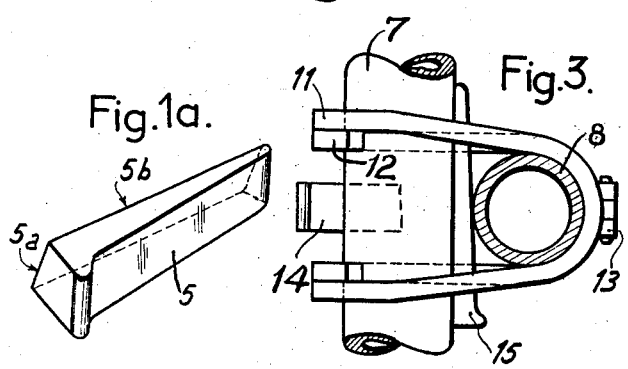
Figure 1a is a detail view thereof.

The assembling device of Figs. 1 to 3 comprises essentially a collar 6 consisting of two parallel U-shaped loops, each loop having its arms connected through other parallel U-shaped loops so as to form a fourfold U, and a set of expanding wedges adapted to effect a resilient deformation of the split tubes engaged at right angles or obliquely to each other in the loops of the aforesaid collar, the radii of these lops being slightly greater than those of the tubes.

Expanding wedges of gradually increasing trapezoidal section 4 are forced in between the two tubes 7, 8, and key members 9, 10 are inserted in the slits 2, 3 of the split tubes between the arms of collar 6.

Thus, the tubes 7, 8 are compressed on the one hand by the clamping action of the wedge member 4 and on the other hand by the expanding action resulting from the insertion of the key members 9, 10 into the split tube slits.

It will be readily understood that, due to the specific direction of the second slope 5b of the key 5 an additional self-wedging action will be obtained on account of the loads transmitted through the cross-member 3 in the direction of the arrow f.

Tubular members of this character are obtained by cold-drawing strip-steel of the mild or semi-mild variety and the elasticity imparted to the metal by this specific working treatment is such that in the case of a tube having for example a 42-millimeter OD and wall thickness of 3 millimeters, the free edges of the slot may be moved away or towards each other by about 6 millimeters without overstepping the elastic limit.

Thus, it will be sufficient to use in this case a slot having by construction a width of about 4 millimeters, and collars or sockets leaving a clearance of the order of 1 mm. on their diameter, to avoid any risk of overstepping the elastic limit of the metal and any possible stiffening of this slot, by providing suitably spaced welding spots.

Figures 2 and 3 illustrate a hinged collar consisting of two half-collars 11, 12 opening on a common hinge pin 13 and having their free ends adapted to cross each other as clearly shown in the figures, so as to permit the insertion of two tubes 7, 8 in the open collar 11 without slipping; the wedging action is obtained by closing the collar which becomes self-clamping.

In this case the key may be preferably somewhat thicker so that when it is removed for dismantling the assembly the free ends of the half-collars 11 and 12 may be tilted and are reinforced to reduce the flexure of these free ends. In these embodiments, as in the preceding one, key members such as 14 may be inserted in the slits of tubes 7, 8 to increase the clamping action through their expansion, in combination with the action of wedge members 15.

What I claim is:

1. A device for assembling split metal tubes which comprises a collar in the form of a fourfold U having radii of curvature of the order of those of the tubes, key members force-fitted between the tubes engaged in perpendicular relationship to each other between the arms of said collar, and expanding wedges force-fitted in the slits of said tubes between the arms of said collar.

2. A device for assembling split metal tubes which comprises a collar in the form of a fourfold U consisting of parallel loops having radii of curvature of the order of those of said tubes, a key member of trapezoidal, gradually-increasing section adapted to be force-fitted between said tubes engaged in perpendicular relationship to each other between the U-shaped arms of said collar, and at least one expanding wedge member force-fitted in at least one of the split tube slits between the arms of said collar.

3. A device for assembling split metal tubes which comprises a collar in the form of two parallel, U-shaped loops interconnected by arcuate portions of substantially same radii as said tubes and hingedly interconnected to each other, a key member adapted to be force-fitted between said tubes engaged in perpendicular relationship to each other in the open hinged arms of said collar, and at least one wedge member force-fitted in at least one of the split tube slits betwen the arms of said collar.

References Cited in the file of this patent

UNITED STATES PATENTS

| | | |
|---|---|---|
| 579,238 | Littlefield | Mar. 23, 1897 |
| 1,834,839 | Hingley | Dec. 1, 1931 |
| 2,604,340 | Hobbs | July 22, 1952 |